UNITED STATES PATENT OFFICE.

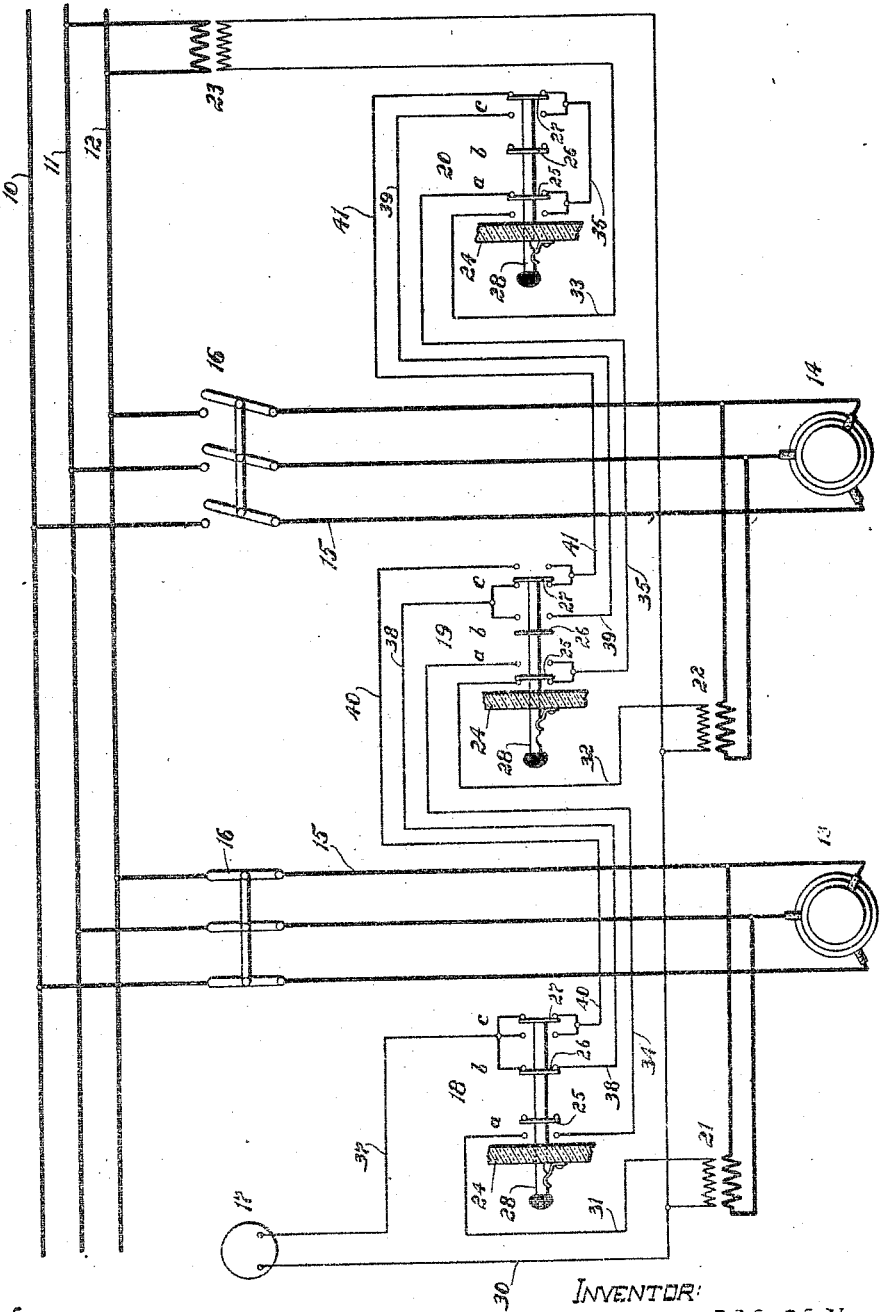

HERMON L. VAN VALKENBURG, OF NORWOOD, OHIO, ASSIGNOR TO THE BULLOCK ELECTRIC MANUFACTURING COMPANY, A CORPORATION OF OHIO.

SYSTEM OF ELECTRICAL DISTRIBUTION.

1,005,905.      Specification of Letters Patent.    Patented Oct. 17, 1911.

Application filed February 28, 1906. Serial No. 303,360.

*To all whom it may concern:*

Be it known that I, HERMON L. VAN VALKENBURG, citizen of the United States, residing at Norwood, in the county of Hamilton and State of Ohio, have invented certain new and useful Improvements in Systems of Electrical Distribution, of which the following is a full, clear, and exact specification.

My invention relates to systems of electrical distribution and particularly to those in which two or more generators are operated in parallel.

As is well known, in operating generators in parallel it is necessary, before any one generator can be connected to the bus-bars, that the voltage of that generator be made equal to the voltage of the bus-bars, and in alternating current distributing systems it is necessary that the electromotive force in the generator about to be connected to the bus-bars be brought into synchronism with the electromotive force in the bus-bars. It is customary to connect a measuring instrument, such as a voltmeter or synchronizer, to the generators by means of a removable plug adapted to fit into a suitable plug receptacle on each switch board panel. With this method two voltmeters are usually employed, one connected permanently to the bus-bars and the other so connected to the several plug receptacles that it may be connected to each generator by inserting the plug in the proper receptacle. This method while satisfactory in some respects possesses several disadvantages. It is difficult to change the plug quickly from one panel to another, and if more than one plug is employed there is a possibility that both plugs may be used at the same time, in which case a short-circuit would result. Furthermore, there is always danger of the plug being broken or destroyed.

In a co-pending application Serial No. 301,818, filed Feb. 19, 1906, I have shown and described a system of distribution consisting of a number of circuits, in that case generators and bus-bars, provided with a number of double-throw "pull and push" instrument switches having contacts so interconnected and arranged that an instrument can be connected to any one generator or to the bus-bars by simply manipulating a single switch and can be easily and quickly transferred from one generator to another by manipulating the switch corresponding to one of said generators provided all the switches between that switch and the instrument are in their normal or in positions. As the instrument switches are shown the contacts are so arranged and interconnected that in case it is desired to connect the instrument to one of the circuits, as for example one of the generators, by manipulating the switch corresponding to that generator, all the switches between the instrument and the first mentioned switch must be in their normal or in positions. However, the position of any switch or switches more remote from the instrument than that switch which is manipulated to connect the circuit corresponding thereto to the instrument does not in the least affect the connections of the instrument to that circuit. To explain this point in detail, assume for example that there are three switches for connecting the instrument to three circuits. If it is desired to connect the instrument to the circuit corresponding to the middle switch that switch will be manipulated or drawn to one position and the switch between the switch in question and the instrument must be in its in or normal position, in order that the circuit may be completed between the instrument and the circuit corresponding to the middle switch. However, the position of the third switch, or the switch more remote from the instrument than the second switch is immaterial, and this third switch could be manipulated without in the least affecting the connection of the instrument to the circuit corresponding to the second switch. Should, however, the first switch, or the switch between the instrument and the second switch, be manipulated, the instrument would be immediately transferred to the circuit corresponding to the first switch. In other words, if there are two or more switches in their "out" positions, the instrument is connected to that circuit corresponding to the "out" switch which is nearest to the instrument. If the switches are visible to the operator from the position of any one switch, he can ascertain, by a glance at the switches, to which circuit the instrument is connected. This system has no material disadvantages when all the switches are visible to the operator. In case, however, all the switches are not visible from any one of the switches the operator can not so easily ascertain to which circuit the instrument is connected, because a switch between any one switch and the instrument may be "out". It is necessary, therefore, in order that the operator may ascertain whether or not the instrument is connected to a circuit corresponding to a certain switch that he manipulate that switch and note whether or not there is a change in the indication of the instrument. If, on manipulating a certain switch, there is a change in the indication of the instrument he will know that all the switches between that switch and the instrument are in their "in" or normal positions and that the instrument is connected to the circuit corresponding to the switch that he has manipulated. But there may not be such a change and still the instrument be so connected. Moreover, if there is more than one operator, one of them may take the instrument away from the other, and neither know it. Thus, if the operator or operators fail to ascertain whether or not the instrument is connected to a generator about to be connected to the bus-bars, and should the instrument in fact be not so connected, a generator might be seriously damaged by being connected to the bus-bars before it is at the proper voltage or before the electromotive force therein is in synchronism with the electromotive force in the bus-bars.

The object of my invention is to provide switches having contacts so arranged and electrically interconnected that it will be impossible to connect the instrument to any circuit by manipulating one of the switches unless all the other switches are in their normal positions. In case "pull and push" switches are employed, and with one of the switches in its "out" position if there is a reading on the instrument the operator will know positively that the instrument is connected to the circuit corresponding to that switch.

My invention consists in the details of construction, and the combinations and arrangements of parts described in the specification and set forth in the appended claims.

For a better understanding of my invention, reference is had to the accompanying drawing which shows a system of distribution consisting of a plurality of circuits equipped with my invention.

As my invention is particularly useful when used in connection with a plurality of generators adapted to be connected to bus-bars, my invention is shown and described in connection with such apparatus. The bus-bars are shown respectively at 10, 11 and 12, and in this case two three-phase generators 13 and 14 are adapted to be connected thereto by suitable leads 15 and switches 16. At 17 is shown a measuring instrument, in this case intended to be a voltmeter, which is adapted to be connected to either generator or to the bus-bars by switches 18, 19 and 20, in a manner to be explained later. It is to be understood that the number of generators can be increased, two being shown merely for the sake of clearness. In this case the instrument is to be connected to the various generator or bus-bar circuits by potential transformers 21, 22 and 23, transformer 21 having its primary connected across two of the conductors or leads of generator 13, transformer 22 having its primary connected across two of the conductors or leads of generator 14, and transformer 23 having its primary connected across two of the bus-bars 11 and 12.

The instrument switches 18, 19 and 20, employed for connecting the instrument to the several circuits, may be mounted in any suitable supports 24. Each switch in this case is a "pull and push" switch and has five points or sets of contacts, and each has three poles $a$, $b$, and $c$, poles $a$ and $c$ having two sets of contacts each, and pole $b$ having one set of contacts. Three movable bridging contact members 25, 26 and 27 are mounted on a horizontal operating handle 28 of each switch and are adapted to engage respectively the contacts of the poles $a$, $b$ and $c$. One side of the voltmeter 17 is connected by conductor 30 to one side of each of the secondaries of the transformers 21 22 and 23. The opposite side of the secondary of transformer 21 is connected by conductor 31 to the upper forward contact of pole $a$ of switch 18. The opposite side of the secondary of transformer 22 is connected by a conductor 32 to upper forward contact of pole $a$ of switch 19. And the opposite side of the secondary of transformer 23 is connected by conductor 33 to the upper forward contact of pole $a$ of switch 20. The lower forward contact of pole $a$ of switch 18 is connected by conductor 34 to the upper rear contact of pole $a$ of switch 19. The two lower contacts of pole $a$ of switch 19 are connected by conductor 35 to the upper rear contact of pole $a$ of switch 20. The two lower contacts of pole $a$ of switch 20 are connected by conductor 36 to the two lower contacts of pole $c$ of switch 20. The opposite side of the voltmeter is connected by conductor 37 to the three upper contacts of poles $b$ and $c$ of switch 18. The lower contact of pole $b$ of switch 18 is connected by conductor 38 to the upper contact of pole $b$ and to the upper forward contact of pole $c$ of switch 19. The lower contact of pole $b$ of switch 19 is connected by conductor 39 to the upper forward contact of pole $c$ of switch 20. The lower contacts of pole $c$ of switch 18 are connected by conductor 40 to the upper rear contact of pole $c$ of switch 19 and the lower contacts of pole $c$ of switch 19 are connected by conductor 41 to the upper rear contact of pole *c* of switch 20.

It is seen that the contacts of the several switches are electrically interconnected, and, as will appear later, to connect the instrument to any circuit the circuit must be completed through all the switches. In other words the switches are electrically interlocked. In each case the circuit connections are made from any one switch through all the other switches more remote from the instrument through pole *a* of each of said switches, to pole *c* of the switch most remote from the instrument, and then back through poles *c* or *b* of all the switches, to the instrument. The result obtained by so arranging and connecting the contacts will best be explained by pointing out the connections and paths of the current through the switches when the instrument is connected to each circuit. As the switches are shown in the drawing, the instrument 17 is connected to the transformer 22 corresponding to generator 14, and therefore the connections and paths of the current from this transformer to the voltmeter through the switches will first be pointed out. It is necessary that the switch 19 be in its "out" position, and, as will appear, it is necessary that the switches 18 and 20 be in their normal or "in" positions. The bridging contact 25 of pole *a* of switch 19 is in engagement with the forward contacts of this pole and the bridging contact 27 of pole *c* is in engagement with the forward contacts of pole *c*. One side of the secondary of transformer 22 is therefore connected through the bridging contact of pole *a* of switch 19 to conductor 35, which is connected to the upper rear contact of pole *a* of switch 20. It is seen therefore that it is necessary that handle of switch 20 be in its normal or "in" position. From this point the circuit is completed as follows: pole *a* of switch 20, conductor 36, pole *c* of switch 20, conductor 41, pole *c* of switch 19, conductor 38, pole *b* of switch 18, conductor 37, and to the instrument. It is seen that, in order that the circuit may be completed through switch 19, it is necessary that switch 18 be in its "in" position. In case therefore that either switch 18 or switch 20 be placed in its "out" position the instrument is disconnected from transformer 22 of generator 14 and as will appear later is disconnected from all the circuits. Now, if it is desired to connect the instrument to generator 13 the handle of switch 18 will be placed in its "out" position, in which case the circuit of the secondary of transformer 21 is connected through pole *a* of switch 18 to conductor 34, which is connected to the upper rear contact of pole *a* of switch 19. It therefore follows that it is necessary that this switch be in its "in" position. When this switch is in its "in" position the circuit is continued as follows: pole *a* of switch 19, conductor 35, pole *a* of switch 20 (which also must needs be "in") conductor 36, pole *c* of switch 20, conductor 41, pole *c* of switch 19 (which as stated must be in its "in" position) conductor 40, pole *c* of switch 18, conductor 37, and to the instrument. It is seen that, in case it is desired to connect the instrument to generator 13, it is necessary that the switch 18 be in its "out" position and that the other switches be in their "in" positions. If either switch 19 or 20, or both, are placed in their "out" positions the instrument is disconnected from the transformer 21. If it is desired to connect the instrument to the bus-bars through transformer 23, switch 20 must be placed in its "out" position, and, as will appear, the other switches must be in their "in" positions. The connections are as follows: the secondary of the transformer 23, pole *a* of switch 20, (this switch now being in its "out" position) conductor 36, pole *c* of switch 20, conductor 39, pole *b* of switch 19, (it is therefore necessary that switch 19 be in its "in" or normal position), conductor 38, pole *b* of switch 18, conductor 37, and to instrument 17. It is seen that it is necessary that switch 18 also be in its "in" position. When switch 19 is "out", it was shown that if either switch 18 or 20 or both were placed in their "out" positions the instrument could not be connected to generator 14. When switch 18 is "out", it was shown that if either switch 19 or 20 or both were placed in their "out" positions, the instrument could not be connected to generator 13. It was also shown that if switch 20 was "out", if either switch 18 or 19 or both were placed in their "out" positions, the instrument could not be connected to the bus-bars. It follows therefore, that to connect the instrument to a circuit, all the instrument switches must be in their proper positions. In other words, the switch corresponding to the circuit to which it is desired to connect the instrument must be in its "out" position and all the other switches must be in their "in" positions, and if two or more switches are "out" the instrument is not connected to any circuit.

My invention has been explained in detail in connection with only three circuits, the circuits being in this case two generators and the bus-bars. It is evident, however, that any number of switches may be interconnected as are the three shown, for connecting the instrument to any one of any number of circuits.

In case the operator wishes to connect the instrument to any generator to measure its potential before connecting the generator to the bus-bars, by simply manipulating the switch corresponding to that generator, if there is a reading on the instrument, he knows with certainty that the instrument is connected to the generator the potential of which he desires to measure, and therefore there is little danger of an error on the part of the operator.

As the contacts are arranged and connected, to connect the instrument to any one circuit the switch corresponding thereto must be placed in its "out" position and all the other switches must be placed in their "in" positions. It is obvious that, if desired, the contacts can be arranged so that the instrument can be connected to a circuit by placing the switch corresponding thereto in its "in" position and all the other switches in their "out" positions.

I have shown merely the circuit connections for a voltmeter, but other instruments, as for example a synchronizer, could be connected to any one of the circuits in the same manner.

I aim in my claims to cover all modifications which do not involve a departure from the spirit and scope of my invention.

What I claim as new and desire to secure by Letters Patent is:—

1. In a system of distribution, the combination of a plurality of circuits, an indicating instrument, double-throw switches for connecting the instrument to the different circuits, and connections between the switches and to the instrument and circuits, said connections when any circuit is connected to the instrument forming a circuit extending in series from the instrument to that circuit through all the switches in definite positions, so that it is impossible to connect the instrument to any circuit unless all the switches are in their proper positions.

2. In a system of distribution, the combination of a plurality of circuits, a measuring instrument, a plurality of instrument switches for connecting said instrument to any one of said circuits one only at a time, and connections between said switches and to the circuits and instrument, said connections when the instrument is connected to any circuit forming a circuit extending in series through all said switches.

3. In a system of distribution, the combination of a plurality of bus-bars, a plurality of generators adapted to be connected thereto in parallel, a measuring instrument, a plurality of double-throw switches for connecting said instrument to any generator or to the bus-bars, and connections which when all the switches save a single one are in one position form a circuit extending in series from the instrument to the bus-bars or to the generator through all the switches, so that it is impossible to connect the instrument to any one generator or to the bus-bars by manipulating the proper switch unless all the other switches are in their normal positions.

4. In a system of distribution, the combination of a plurality of generators, bus-bars to which said generators are adapted to be connected in parallel, a measuring instrument, a plurality of double-throw switches for connecting said instrument to any one of said generators or to the bus-bars, said switches each having two operative positions, and connections which when any one switch is in one position form a circuit extending in series from one of the generators or the bus-bars to the instrument through all the other switches in the other position, so that to make such connection it is necessary that all said other switches be in said other positions.

5. In a system of distribution, the combination of a plurality of circuits, a measuring instrument, and a plurality of double-throw switches for connecting the instrument to any one of said circuits, said switches having connections which form a circuit extending in series from any one of said plurality of circuits to the instrument through one switch in one position and all the other switches in the other position, so that only by placing one switch in one position and all the other switches in the opposite position can the instrument be connected to the circuit corresponding to the first switch.

6. In a system of distribution, the combination of a plurality of circuits, a measuring instrument, a plurality of switches for connecting said instrument to any one of said circuits one only at a time, and connections between the switches and to the instrument and circuits, which connections when the instrument is connected to any one circuit form a circuit which extends in series through all said switches and is interrupted if any switch is not in the proper position.

7. In a system of distribution, the combination of a plurality of principal circuits, a measuring instrument, a plurality of "pull and push" double-throw switches for connecting the instrument to any one of said circuits, said switches having connections among themselves and to the instrument and switches which when any principal circuit is connected to the instrument form an instrument circuit extending in series through the switch corresponding to that principal circuit in one position and all the other switches in the other position.

8. In a system of distribution, the combination of a plurality of circuits, a measuring instrument, a plurality of switches for connecting the instrument to any one of said circuits, said switches being arranged in order, and connections which form a circuit extending in series from one side of any of said plurality of circuits to the switch electrically most remote from the instrument and then through all the other switches to the instrument.

9. In a system of distribution, the combination of a plurality of circuits, a measuring instrument having one side connected to one side of each of said circuits, and a plurality of instrument switches for connecting the other side of the instrument to the other side of any one of said circuits, said switches having certain contacts to connect the instrument through all the switches successively and other contacts to connect the switch most remote electrically from the instrument to the normally disconnected side of any one of said circuits.

10. In a system of distribution, the combination of a plurality of circuits, a measuring instrument, a plurality of multiple switches for connecting the instrument to any one of said circuits, and connections which form a circuit extending in series from the instrument through all said switches and then from the last of said switches to one side of any one of said plurality of circuits to which it is desired to connect the instrument.

11. In a system of distribution, the combination of a plurality of circuits, a measuring instrument, a plurality of three-pole switches for connecting the instrument to any one of said circuits, and connections between the contacts of the switches and from such contacts to the instrument and the circuits, which connections when one switch is in one position and each of the other switches is in the other position form a series circuit from the instrument to the circuit corresponding to the switch in the one position through contacts of all said switches.

12. In a system of distribution, the combination of a plurality of circuits, a measuring instrument, a plurality of "pull and push" switches arranged in order and each having three poles $a$, $b$, and $c$, for connecting the instrument to any one of said circuits, and connections between the switches and from the switches to the instrument and the circuits, said connections when one switch is in one position and all the other switches are in the opposite position forming a circuit which extends in series from one side of the circuit corresponding to the switch in the one position to one side of the instrument, through contacts of pole $a$ of the switch in the one position and of all the switches more remote from the instrument, and through contacts of pole $b$ or $c$ of all the switches.

13. In combination, a plurality of circuits, an indicating instrument, and a plurality of switches, each switch when in one position connecting said instrument to one of said circuits by way of a circuit extending in series through contacts on all said switches in definite positions.

14. In combination, a plurality of circuits, a measuring instrument, and a plurality of switches for connecting the instrument to any one of said circuits, each switch having a contact connected to one of said circuits and a coöperating contact connected in series through contacts on all the other switches to the instrument, so that if any one of said switches is not in proper position the instrument circuit is broken.

15. In a system of distribution, the combination of a plurality of circuits, an indicating instrument, a switch corresponding to each of the circuits, and connections between the circuits, switches, and instrument so that when any switch is in an abnormal position it connects its corresponding circuit to the indicating instrument by way of a circuit extending in series through all the other switches in normal position, so that such connection can be made under such conditions only.

16. In a system of distribution, the combination of a plurality of circuits, an indicating instrument, a double-throw switch corresponding to each circuit, and connections between said circuits, switches, and instrument, which connections when one switch is in one position and all the other switches are in the other position form a circuit extending from that one of the plurality of circuits which corresponds to the switch in the other position in series through all the switches to the instrument, so that in order to connect any circuit to the instrument the switch corresponding to said circuit must be in one position and each of the other switches in the other position.

17. In a system of distribution, the combination of a plurality of circuits, an indicating instrument, a plurality of double-throw switches arranged in order and each having at least one of said circuits associated with it, and a series connection which extends from the instrument through all the switches save one in one position, and then through the excepted switch to the circuit associated therewith.

In testimony whereof I affix my signature, in the presence of two witnesses.

HERMON L. VAN VALKENBURG.

Witnesses:
 HARRIET SUTPHIN,
 FRED J. RINSEY.